(12) United States Patent
Matsuo

(10) Patent No.: US 8,364,727 B2
(45) Date of Patent: Jan. 29, 2013

(54) INFORMATION PROCESSING APPARATUS, INFORMATION PROCESSING METHOD AND COMPUTER READABLE MEDIUM

(75) Inventor: Takenori Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 158 days.

(21) Appl. No.: 12/728,500

(22) Filed: Mar. 22, 2010

(65) Prior Publication Data

US 2011/0047124 A1    Feb. 24, 2011

(30) Foreign Application Priority Data

Aug. 18, 2009   (JP) ................................. 2009-189446

(51) Int. Cl.
     *G06F 17/24*      (2006.01)
     *G06F 17/30*      (2006.01)

(52) U.S. Cl. ........................ 707/806; 715/229
(58) Field of Classification Search .................. 707/616, 707/641, 695, 808, 806; 715/229
See application file for complete search history.

(56) References Cited

U.S. PATENT DOCUMENTS

| | | | | |
|---|---|---|---|---|
| 5,758,358 | A * | 5/1998 | Ebbo ...................................... | 1/1 |
| 5,790,848 | A * | 8/1998 | Wlaschin ............................. | 707/661 |
| 5,828,885 | A | 10/1998 | Raman | |
| 6,397,231 | B1 * | 5/2002 | Salisbury et al. ................ | 715/234 |
| 6,772,165 | B2 * | 8/2004 | O'Carroll ............................. | 1/1 |
| 7,131,112 | B1 * | 10/2006 | Bartz et al. ........................ | 717/122 |
| 7,249,314 | B2 * | 7/2007 | Walker et al. .................... | 715/205 |
| 7,401,291 | B2 * | 7/2008 | Ramaley et al. .................. | 715/255 |
| 7,640,255 | B2 * | 12/2009 | Brookler ............................. | 1/1 |
| 7,865,816 | B2 * | 1/2011 | Tanaka .............................. | 715/230 |
| 7,913,161 | B2 * | 3/2011 | Rivas et al. ....................... | 715/229 |
| 2006/0173884 | A1 | 8/2006 | Lin et al. | |
| 2007/0038684 | A1 | 2/2007 | Degtyar | |
| 2007/0047014 | A1 | 3/2007 | Kawabuchi et al. | |
| 2008/0082829 | A1 * | 4/2008 | Yoshioka et al. ................ | 713/176 |
| 2009/0150394 | A1 | 6/2009 | Bailor et al. | |
| 2009/0313331 | A1 * | 12/2009 | Rasmussen et al. ........... | 709/205 |

FOREIGN PATENT DOCUMENTS

| | | |
|---|---|---|
| JP | 2007-58621 A | 3/2007 |
| JP | 2008-077200 A | 4/2008 |

OTHER PUBLICATIONS

Office Action (Examiner's first report) dated Nov. 24, 2010, issued in corresponding Australian application No. 2010201444.

* cited by examiner

Primary Examiner — Jorge A Casanova
(74) Attorney, Agent, or Firm — Sughrue Mion, PLLC

(57) ABSTRACT

According to an aspect of the invention, an information processing apparatus includes a sub information providing unit, a sub information adding unit, and a display unit. The sub information providing unit gives, to a first electronic file including first main information, first sub information that is manipulatable independently from the first main information. The sub information adding unit adds a second sub information to the first electronic file, the first main information and a second main information being at least partially identical to each other. The display unit displays the first main information, the first additional information, and the second additional information which are included in the first electronic file.

14 Claims, 16 Drawing Sheets

*FIG. 3*

| MAIN INFORMATION |
|---|
| PAGE 1 |
| PAGE 2 |

| SUB INFORMATION | |
|---|---|
| NAME | : FOR DEPARTMENT B |
| DISPLAY TEXT | : PLEASE REVIEW ELECTRONIC FILE IN DEPARTMENT B |
| HASH VALUE<br>PAGE 1<br>PAGE 2 | <br>: 76BDE93AC482HBA4CABF84762E5D7D<br>: 197DE34DFBADC612EDA87G6F6753E4 |
| OPERATION COMMAND<br>IDENTIFICATION INFORMATION<br>TYPE<br>OPERATION CONTENT | <br>: 00001<br>: TASK<br>: TRANSMISSION TO DEPARTMENT B |
| OPERATION COMMAND<br>IDENTIFICATION INFORMATION<br>TYPE<br>POSITION<br>SIZE<br>DISPLAY TEXT<br>OPERATION CONTENT | <br>: 00002<br>: BUTTON<br>: 80,220<br>: 50,8<br>: END REVIEW<br>: TRANSMISSION TO USER A |

FIG. 6

| MAIN INFORMATION | |
|---|---|
| PAGE 1 | |
| PAGE 2 | |

| SUB INFORMATION | |
|---|---|
| NAME | : FOR DEPARTMENT B |
| DISPLAY TEXT | : PLEASE REVIEW ELECTRONIC FILE IN DEPARTMENT B |
| HASH VALUE<br>PAGE 1<br>PAGE 2 | <br>: 76BDE93AC482HBA4CABF84762E5D7D<br>: 197DE34DFBADC612EDA87G6F6753E4 |
| OPERATION COMMAND<br>IDENTIFICATION INFORMATION<br>TYPE<br>OPERATION CONTENT | <br>: 00001<br>: TASK<br>: TRANSMISSION TO DEPARTMENT B |
| OPERATION COMMAND<br>IDENTIFICATION INFORMATION<br>TYPE<br>POSITION<br>SIZE<br>DISPLAY TEXT<br>OPERATION CONTENT | <br>: 00002<br>: BUTTON<br>: 80,220<br>: 50,8<br>: END REVIEW<br>: TRANSMISSION TO USER A |
| ADDITIONAL INFORMATION<br>IDENTIFICATION INFORMATION<br>TYPE<br>POSITION<br>GIVER INFORMATION | <br>: 00001<br>: TAG<br>: FIRST PAGE,180,100<br>: USER B |
| ADDITIONAL INFORMATION<br>IDENTIFICATION INFORMATION<br>TYPE<br>POSITION<br>GIVER INFORMATION | <br>: 00002<br>: TAG<br>: FIRST PAGE,180,150<br>: USER B |
| ADDITIONAL INFORMATION<br>IDENTIFICATION INFORMATION<br>TYPE<br>POSITION<br>GIVER INFORMATION | <br>: 00003<br>: TAG<br>: SECOND PAGE,180,200<br>: USER B |

FIG. 9

| MAIN INFORMATION | |
|---|---|
| PAGE 1 | |
| PAGE 2 | |

| SUB INFORMATION | |
|---|---|
| NAME | : FOR DEPARTMENT B |
| ⋮ | |
| ADDITIONAL INFORMATION<br>IDENTIFICATION INFORMATION<br>TYPE<br>POSITION<br>GIVER INFORMATION | <br>: 00001<br>: TAG<br>: FIRST PAGE,180,100<br>: USER B |
| ADDITIONAL INFORMATION<br>IDENTIFICATION INFORMATION<br>TYPE<br>POSITION<br>GIVER INFORMATION | <br>: 00002<br>: TAG<br>: FIRST PAGE,180,150<br>: USER B |
| ADDITIONAL INFORMATION<br>IDENTIFICATION INFORMATION<br>TYPE<br>POSITION<br>GIVER INFORMATION | <br>: 00003<br>: TAG<br>: SECOND PAGE,180,200<br>: USER B |

| SUB INFORMATION | |
|---|---|
| NAME | : FOR DEPARTMENT C |
| ⋮ | |
| ADDITIONAL INFORMATION<br>IDENTIFICATION INFORMATION<br>TYPE<br>POSITION<br>GIVER INFORMATION | <br>: 00004<br>: TAG<br>: FIRST PAGE,180,170<br>: USER C |

| SUB INFORMATION | |
|---|---|
| NAME | : FOR DEPARTMENT D |
| ⋮ | |
| ADDITIONAL INFORMATION<br>IDENTIFICATION INFORMATION<br>TYPE<br>POSITION<br>GIVER INFORMATION | <br>: 00005<br>: TAG<br>: SECOND PAGE,180,125<br>: USER D |
| ADDITIONAL INFORMATION<br>IDENTIFICATION INFORMATION<br>TYPE<br>POSITION<br>GIVER INFORMATION | <br>: 00006<br>: TAG<br>: SECOND PAGE,180,250<br>: USER E |

*FIG. 14*

| MAIN INFORMATION |
|---|
| PAGE 1 |
| PAGE 2 |
| PAGE 3 |

| SUB INFORMATION |
|---|
| NAME : FOR DEPARTMENT B |
| HASH VALUE<br>PAGE 1  : 76BDE93AC482HBA4CABF84762E5D7D<br>PAGE 3  : 21BA09F11572C3B6207EDB4649DD13 |
| ADDITIONAL INFORMATION<br>IDENTIFICATION INFORMATION : 00001<br>TYPE  : TAG<br>POSITION  : FIRST PAGE,180,150<br>DISPLAY TEXT  : PAGE 2 WAS REPLACED WITH PAGE 3<br>GIVER INFORMATION  : USER B |

FIG. 16

| MAIN INFORMATION |
|---|
| PAGE 1 |
| PAGE 2 |

| ADDITIONAL INFORMATION | |
|---|---|
| IDENTIFICATION INFORMATION | : 00001 |
| TYPE | : TAG |
| POSITION | : FIRST PAGE,180,100 |
| GIVER INFORMATION | : USER B |
| ADDITIONAL INFORMATION | |
| IDENTIFICATION INFORMATION | : 00002 |
| TYPE | : TAG |
| POSITION | : FIRST PAGE,180,150 |
| GIVER INFORMATION | : USER B |
| ADDITIONAL INFORMATION | |
| IDENTIFICATION INFORMATION | : 00003 |
| TYPE | : TAG |
| POSITION | : SECOND PAGE,180,200 |
| GIVER INFORMATION | : USER B |

| SUB INFORMATION | |
|---|---|
| NAME | : FOR DEPARTMENT B |
| DISPLAY TEXT | : PLEASE REVIEW ELECTRONIC FILE IN DEPARTMENT B |
| HASH VALUE | |
| PAGE 1 | : 76BDE93AC482HBA4CABF84762E5D7D |
| PAGE 2 | : 197DE34DFBADC612EDA87G6F6753E4 |
| OPERATION COMMAND | |
| IDENTIFICATION INFORMATION | : 00001 |
| TYPE | : TASK |
| OPERATION CONTENT | : TRANSMISSION TO DEPARTMENT B |
| OPERATION COMMAND | |
| IDENTIFICATION INFORMATION | : 00002 |
| TYPE | : BUTTON |
| POSITION | : 80,220 |
| SIZE | : 50,8 |
| DISPLAY TEXT | : END REVIEW |
| OPERATION CONTENT | : TRANSMISSION TO USER A |

INFORMATION PROCESSING APPARATUS, INFORMATION PROCESSING METHOD AND COMPUTER READABLE MEDIUM

CROSS-REFERENCE TO RELATED APPLICATIONS

This application is based upon and claims priority under 35 USC 119 from Japanese Patent Application No. 2009-189446, filed Aug. 18, 2009.

BACKGROUND

Technical Field

The present invention relates to an information processing apparatus, an information processing method, and a computer readable medium.

SUMMARY OF THE INVENTION

According to an aspect of the invention, an information processing apparatus includes a sub information providing unit, a sub information adding unit, and a display unit. The sub information providing unit gives, to a first electronic file including first main information, first sub information that is manipulatable independently from the first main information and includes one or more first additional information items and that gives, to a second electronic file including second main information, second sub information that is manipulatable independently from the second main information and includes one or more second additional information items. The sub information adding unit adds the second sub information to the first electronic file, the first main information and the second main information being at least partially identical to each other. The display unit displays the first main information, the first additional information, and the second additional information which are included in the first electronic file.

BRIEF DESCRIPTION OF THE DRAWINGS

Exemplary embodiments of the invention will be described in detail based on the following figures, wherein:

FIG. 3 is a diagram schematically illustrating the content of an electronic file to be sent to a department B;

FIG. 6 is a diagram schematically illustrating the content of the electronic file shown in FIG. 5;

FIG. 9 is a diagram schematically illustrating the content of the electronic file shown in FIG. 8;

FIG. 14 is a diagram schematically illustrating the content of the electronic file shown in FIG. 13;

FIG. 16 is a diagram schematically illustrating the content of the electronic file after the association of the additional information is changed.

DETAILED DESCRIPTION

Figure 1:
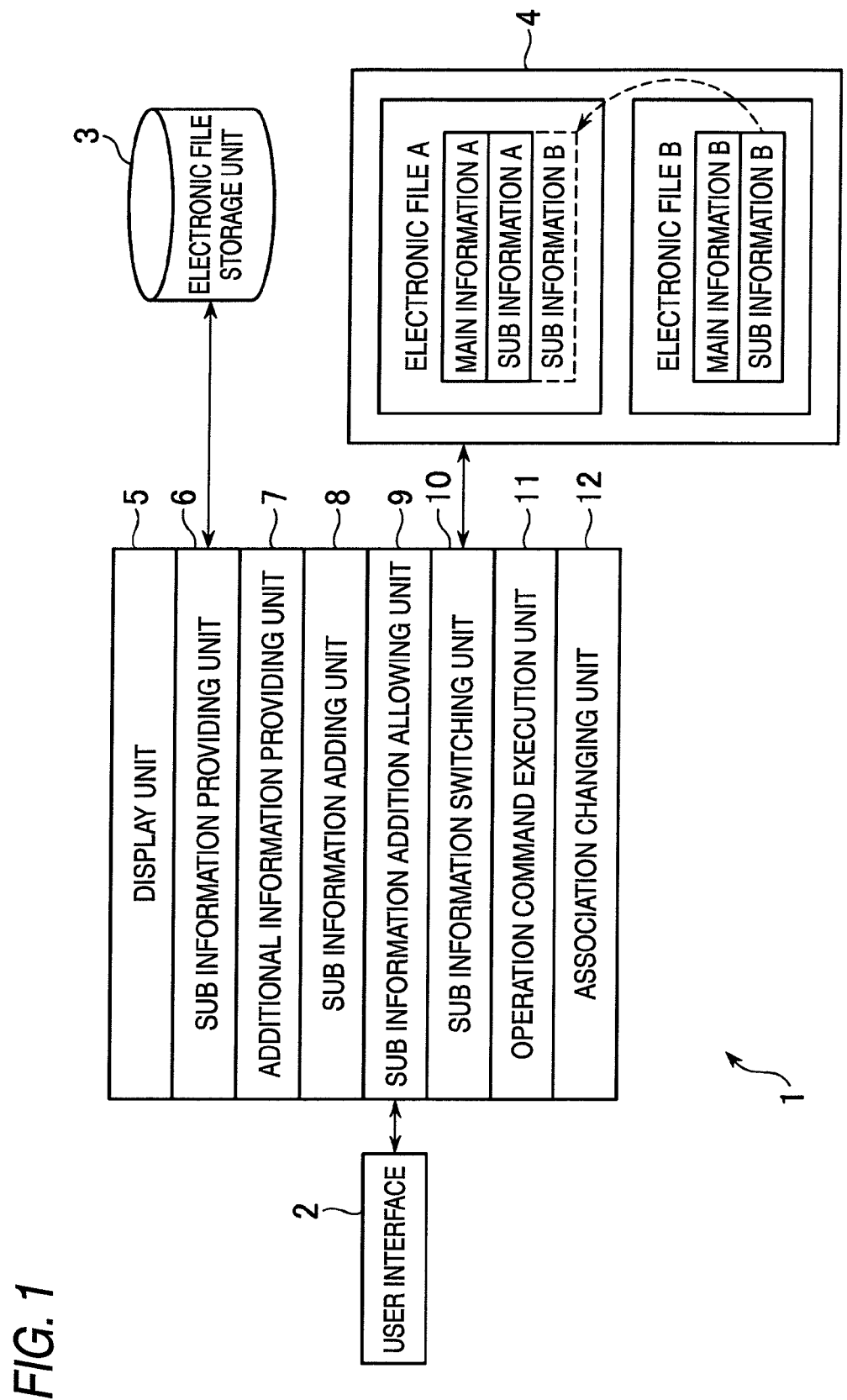
FIG. 1 is a functional block diagram illustrating an information processing apparatus according to an exemplary embodiment of the invention.

FIG. 1 is a functional block diagram illustrating an information processing apparatus 1 according to an exemplary embodiment of the invention.

The information processing apparatus 1 is a general computer which is physically a general-purpose information processing apparatus and includes a CPU (Central Processing Unit), a memory, an input/output interface, a monitor, and an external storage device. A computer program for operating the computer as the information processing apparatus 1 is executed on the computer to virtually implement the information processing apparatus 1. The computer program for operating the computer as the information processing apparatus 1 may be stored in an arbitrary information storage medium, such as a DVD-ROM (DVD-Read Only Memory) or a CD-ROM (Compact Disk Read Only Memory) and then provided, or it may be provided as computer-readable electric signals through a telecommunication line, such as the Internet, which is a representative example of a public line.

The information processing apparatus 1 includes a user interface 2 that presents information to the user using an image display device, such as a monitor, and an input device, such as a keyboard or a mouse, or receives input information, an electronic file storage unit 3, which is an information storage device such as an HDD (Hard Disk Drive), and a work area 4 including an information storage device such as a semiconductor memory. The user interface 2, the electronic file storage unit 3, and the work area 4 are controlled by each functional block that is virtually implemented by the program executed on the computer. Hereinafter, each functional block of the information processing apparatus 1 will be described.

A display unit 5, serving as a display device, acquires a first electronic file (hereinafter, referred to as an 'electronic file A') from the electronic file storage unit 3 in response to an instruction from the user through the user interface 2 and displays main information (hereinafter, referred to as 'main information A') included in the electronic file A and additional information which is added to the main information A such that the user can read the information. The additional information is included in sub information (hereinafter, referred to as 'sub information A') which is included in the electronic file A. The additional information may be directly included in the electronic file A. In this case, the display unit 5 expands the acquired electronic file A in the work area 4. When the electronic file A is expanded in the work area 4, all data is not necessarily expanded, but a portion of the data may be expanded. Then, the display unit 5 appropriately shapes the main information A and the additional information on the basis of the electronic file A expanded in the work area 4 and displays the shaped information on, for example, the monitor of the user interface 2.

The main information means principal information included in the electronic file and is to be provided to the user. The main information is not particularly limited, and a representative example of the main information is document data. The main information may include image data, such as pictures and illustrations, moving picture data, and combinations thereof.

The sub information is subordinate information that complements the main information included in the electronic file and may include additional information. In addition, the sub information is discriminated from the main information in the electronic file, and is extracted separately from the main information or is separated from the main information. The additional information is not particularly limited. Representative examples of the additional information include tag information, which is text information to which a tag is added and which is displayed so as to overlap the displayed main information, figure information, such as an underline, a frame, or a check mark, which is displayed so as to overlap the main information in order to highlight a portion of the main information, and comment information, which is text information displayed on or around a moving picture at a specific timing. In this exemplary embodiment, document data is given as an example of the main information and tag information is given as an example of the additional information. However, the invention is not limited thereto.

The information processing apparatus 1 further includes a sub information providing unit 6 serving as sub information providing device, and gives sub information to the displayed electronic file on the basis of an instruction from the user input through the user interface 2. FIG. 1 shows the electronic file A having the sub information A given thereto. In this case, the sub information A may include only information indicating that there is the sub information A, or it may include other information. For example, other information includes information for specifying the main information A included in the electronic file A to which the sub information A is given, information for specifying the sub information A, and display information for visually displaying the presence of the sub information A. A method of visually displaying the presence of the sub information A is not particularly limited. In this exemplary embodiment, the display unit 5 displays the sub information A as a cover that is added to document data in the main information A.

The additional information providing unit 7 gives the additional information to the electronic file on the basis of an instruction from the user input through the user interface 2. As the displayed electronic file A, when the additional information is given to the electronic file including the sub information, the additional information is given so as to be included in the sub information. The inclusion of the additional information in the sub information does not necessarily mean that the additional information is arranged in a storage area which is ensured as the sub information, but means that the additional information and the sub information are associated with each other. That is, when the given additional information is associated with the sub information, the additional information is included in the sub information since the additional information is regarded as a portion of the sub information.

Whether the additional information providing unit 7 gives additional information such that newly given additional information is included in the sub information is determined by specific conditions, or it is selected by the user. When an electronic file includes a plurality of sub information items, one of the sub information items including the additional information given thereto is also determined by specific conditions, or it is selected by the user.

A sub information adding unit 8, serving as a sub information adding device, adds sub information (hereinafter, referred to as 'sub information B') included in a second electronic file (hereinafter, referred to as an 'electronic file B') to the electronic file A. In the example shown in FIG. 1, the information processing apparatus 1 expands the electronic file B on the work area 4, in addition to the electronic file A from the electronic file storage unit 3. Then, the main information B and the sub information B are included in the electronic file B. In this state, as represented by a dashed line in FIG. 1, the sub information adding unit 8 adds the sub information B to the electronic file A. As a result, the additional information included in the sub information B is also displayed on the user interface 2 by the display unit 5. In this case, the sub information B given to the electronic file B may be deleted and the sub information B may be moved from the electronic file B to the electronic file A. Alternatively, the sub information B may be copied from the electronic file B to the electronic file A, without being deleted. Preferably, the user selects one of the movement of the sub information and the copy of the sub information.

In this case, the sub information addition allowing unit 9 allows the sub information adding unit 8 to add the sub information under specific conditions. That is, in this exemplary embodiment, when the main information A included in the electronic file A is different from the main information B included in the electronic file B, an error is likely to occur in the addition of the sub information B to the electronic file A due to, for example, a mistake in operation. Therefore, the sub information addition allowing unit 9 compares the main information A with the main information B using a given method. When the main information A is at least partially identical to the main information B, the sub information addition allowing unit 9 allows the sub information adding unit 8 to add the sub information. The reason is as follows. When the main information A and the main information B have common information, for example, when the main information A is obtained by correcting the main information B, an operation of adding the sub information B to the electronic file A is likely to be appropriate. Of course, the main information A may be completely identical to the main information B as the condition for allowing it.

A method of determining whether the main information A and the main information B are at least partially identical to each other is not particularly limited. A first example of the method compares the main information A with the main information B and determines whether the main information A is identical to the main information B. In this case, when the identity between the main information items is equal to or more than a predetermined percentage, for example, 90%, the addition of the sub information may be allowed. A second example of the method compares a hash value that is calculated from the main information A by a specific hash function with a hash value that is calculated from the main information B by the same hash function and allows the addition of the sub information when the hash values are identical to each other. In this case, the hash value may be calculated whenever the operation of adding the sub information is performed. Alternatively, the hash values of the main information A and the main information B may be calculated in advance and the sub information A and the sub information B may include the calculated hash values. A third example of the method is as follows: when each of the main information A and the main information B is divided in a specific unit, for example, in a unit of a page, a hash value is calculated for each specific unit, and the addition of the sub information is allowed when the hash value identical between the main information A and the main information B is one or more. In this case, the hash value may be calculated whenever the operation of adding the sub information is performed. In this exemplary embodiment, the third example is used. The hash value for each page of the main information A and the main information B, which are document data, is included in the sub information A and the sub information B. Of course, methods other than the above-mentioned methods may be used.

When the sub information addition allowing unit 9 does not allow the sub information adding unit 8 to add the sub information, it performs a specific operation. The type of operation is appropriately selected. For example, the following operation may be performed: the addition of the sub information by the sub information adding unit 8 is prohibited; a dialogue is displayed on the user interface 2 to notify the user that the main information A is not identical to the main information B such that the user selects whether to add the sub information; or a message indicating that the main information A is not identical to the main information B is displayed on the user interface 2 to notify it to the user.

The sub information addition allowing unit 9 may be omitted. In this case, the sub information adding unit 8 adds the sub information B to the electronic file A, regardless of whether the main information A is identical to the main information B.

A sub information switching unit 10, serving as a sub information switching device, switches the validity and the invalidity of the sub information included in the electronic file. That is, the sub information switching unit 10 selects whether to validate or invalidate each sub information item included in the electronic file in response to an instruction from the user. The additional information included in the sub information that is determined to be valid is displayed on the user interface 2 by the display unit 5. On the other hand, the additional information included in the sub information that is determined to be invalid is not displayed on the user interface 2 by the display unit 5. In the example shown in FIG. 1, when the sub information A included in the electronic file A is valid and the sub information B is invalid, the additional information included in the sub information A is displayed on the user interface 2, but the additional information included in the sub information B is not displayed. In other words, the sub information switching unit 10 switches a display state of the sub information A and the sub information B.

An operation command execution unit 11, serving as an operation command execution device, executes an operation command that is included in the sub information and controls the information processing apparatus 1 to perform a specific operation when specific conditions are satisfied. The operation command and the specific conditions are not particularly limited. For example, a specific operation of the user for executing an operation command is detected, and an electronic file is added to an electronic mail and is then sent to another user. A method of executing the operation command is not particularly limited. For example, plural types of operation commands in which a specific operation and specific conditions are determined may be prepared in advance and the user may add a desired operation command to the sub information, if necessary. Alternatively, the user may describe an arbitrary operation command with a script language.

An association changing unit 12, serving as an association changing device, changes the association of the additional information included in the sub information with the sub information to the association of the additional information included in the sub information with the electronic file. As a result, the additional information with the changed association is not associated with specific sub information. The association may be changed by changing the position of the additional information in the electronic file or by rewriting association information between the additional information and the sub information.

The structure and operation of the information processing apparatus 1 have been described above. Next, the operation of the information processing apparatus 1 will be described with reference to a detailed example, for ease of understanding. In the following description, the information processing apparatus 1 is just an illustrative example, but the invention is not limited thereto.

Figure 2:
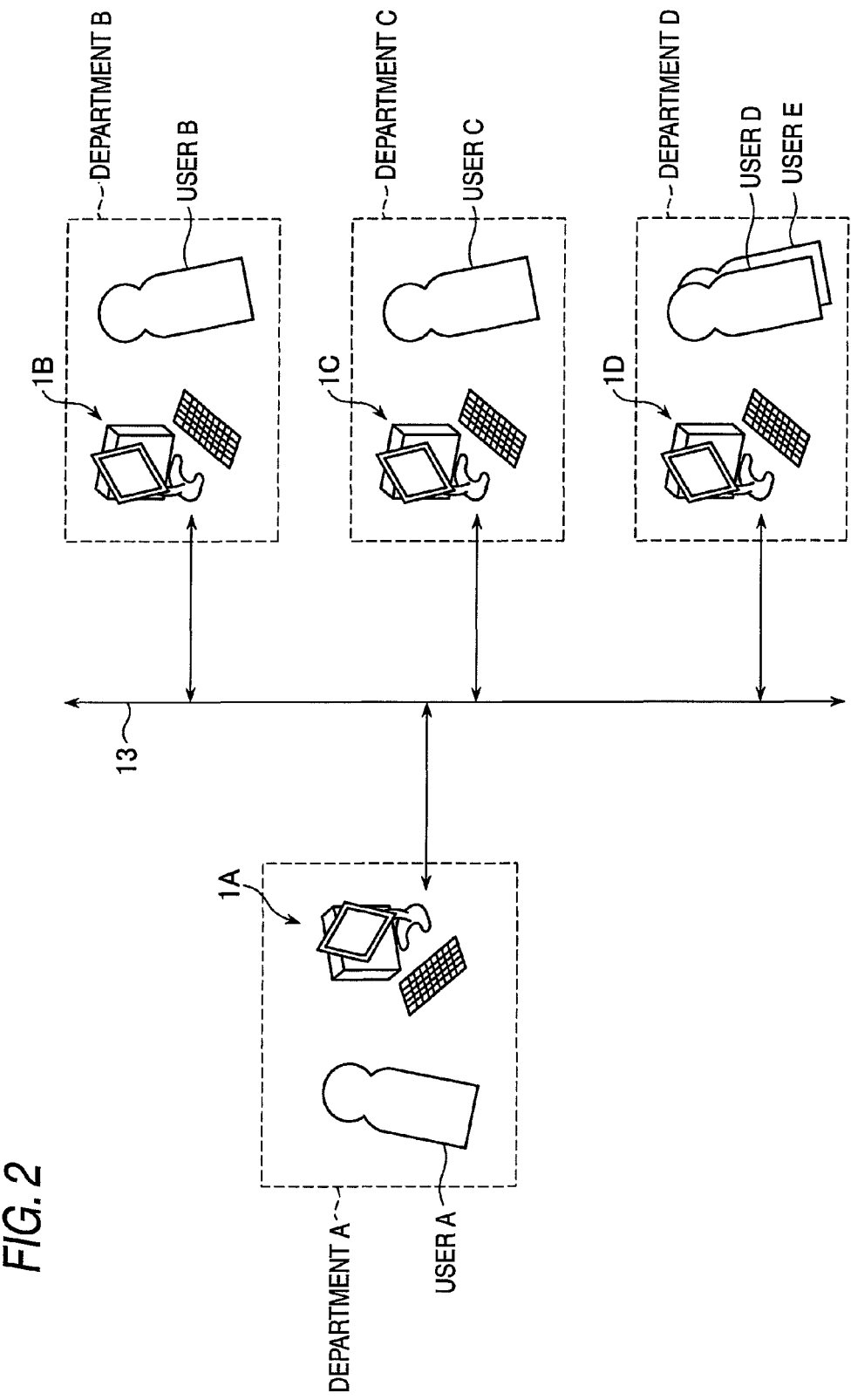
FIG. 2 is a diagram schematically illustrating the review of an electronic file using a computer network.

FIG. 2 is a diagram schematically illustrating the review of an electronic file using a computer network. For example, it is assumed that a department B, a department C, and a department D review document data created by a user A who belongs to a department A in a company in parallel. In FIG. 2, a solid line 13 indicates a telecommunication line, such as the Internet, for information communication between computers. The department A, the department B, the department C, and the department D include information processing apparatuses 1A, 1B, 1C, and 1D, respectively, and the information processing apparatuses 1A, 1B, 10, and 1D are connected to the telecommunication line 13.

The user A uses the information processing apparatus 1A to give sub information to be sent to each department that requests a review of the document data created by the user A. Specifically, the user A copies document data to create three electronic files and gives sub information to be sent to the department B, sub information to be sent to the department C, and sub information to be sent to the department D to the electronic files. The sub information includes the name of the sub information, text data indicating whether each department is requested to review it, an operation command to send the electronic file to each department, and an operation command for returning the electronic file to the user A after the review ends.

This structure is just an illustrative example, and any type of sub information may be used. In this example, different electronic files are sent to the departments, but a common electronic file may be sent to the departments.

FIG. 3 is a schematic diagram illustrating the content of the electronic file to be sent to the department B. In FIG. 3, the main information is document data created by the user A. In this example, the main information is a 2-page document, and data of page 1 and data of page 2 are included in the main information.

FIG. 3 shows the sub information that is given to the electronic file to be sent to the department B by the user A. The sub information includes the name of the sub information, display text forming display information that is displayed when the display unit 5 (see FIG. 1) displays the sub information such that the user can visually recognize the sub information, a hash value generated from the data of each page of the main information, and two operation commands added by the user A. When the display unit 5 displays the sub information as a cover of document data, the display text is text data displayed on the cover. Each operation command includes unique identification information for identifying the operation command. An operation command with identification information '00001' means that the type of operation command is a 'task' and the operation content thereof is 'transmission to the department B'. The 'task' means an operation command executed when the user operates the information processing apparatus 1 to perform a task. The operation content is the transmission of the electronic file to the department B. Similarly, an operation command with identification information '00002' means that the type of operation command is a 'button'. When the sub information is displayed as a cover, a button is displayed on the cover by the operation command. The operation command is executed when the user pushes the button, for example, when the user uses a user interface, such as a mouse, to click the button. A position and a size indicate the position and the size of the button displayed on the screen. The display text indicates a character string displayed on the button and the operation content is the transmission of the electronic file to the user A.

Figure 4:
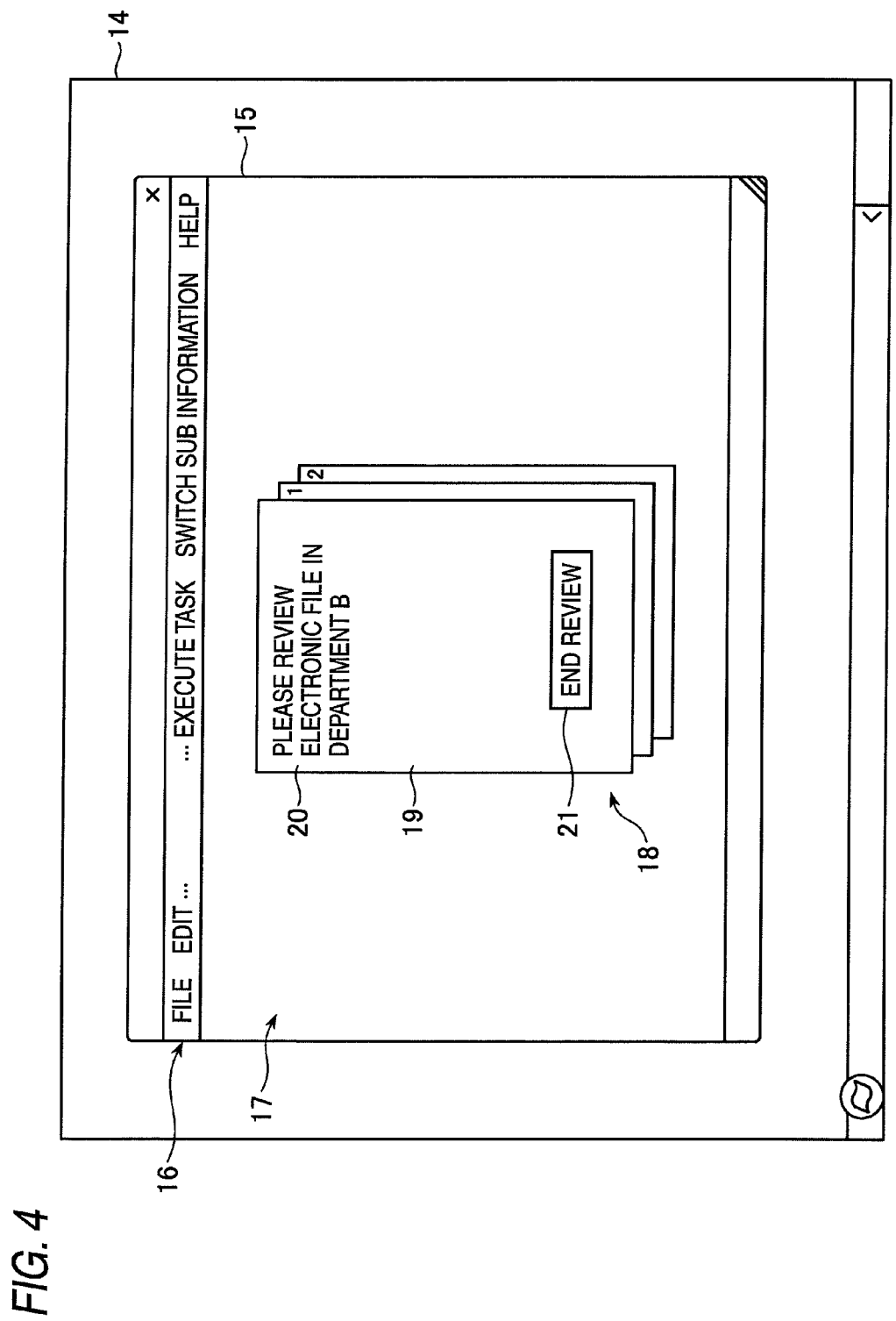
FIG. 4 is a diagram illustrating the display of the electronic file shown in FIG. 3.

FIG. 4 is a diagram illustrating the display of the electronic file shown in FIG. 3. FIG. 4 shows a screen 14 that is displayed on a monitor, which is the user interface 2 (see FIG. 1) of the information processing apparatus 1A (see FIG. 2). The information processing apparatus 1 is implemented by the program that is executed on a general OS (Operating System) operated on a general-purpose computer, and the OS supports a so-called multi-window and multi-task. A window 15 is a GUI (Graphical User Interface) of the information processing apparatus 1. Various commands executed on the information processing apparatus 1 are displayed in the form of a menu in a menu region 16 of the window 15, and a display image 18 of the electronic file to be sent to the department B is displayed in a display region 17. The sub information of the electronic file is displayed as a cover 19, and a display text 20 and a button 21, which is an operation command, are displayed on the cover 19. The main information of the electronic file is displayed in unit of page on the rear side of the cover 19. A page number is displayed on the upper right side of each page of the main information. In this state, when the user A selects an item 'task execution' from the menu, a 'task' operation command among the operation commands included in the sub information is executed. That is, the operation command with the identification information '00001' shown in FIG. 2 is executed and the electronic file is sent to the department B.

The invention is not limited to the above-mentioned transmission method. For example, the information processing apparatus 1B provided in the department B may receive the electronic file or the electronic file may be sent to a representative e-mail address of the department B or the address of the person in charge of the department B.

The sub information to be sent to the departments C and D is given to the main information by the same method as described and is then transmitted to the departments C and D. The department B, the department C, and the department D review each electronic file in parallel and give additional information to the electronic file.

Figure 5:
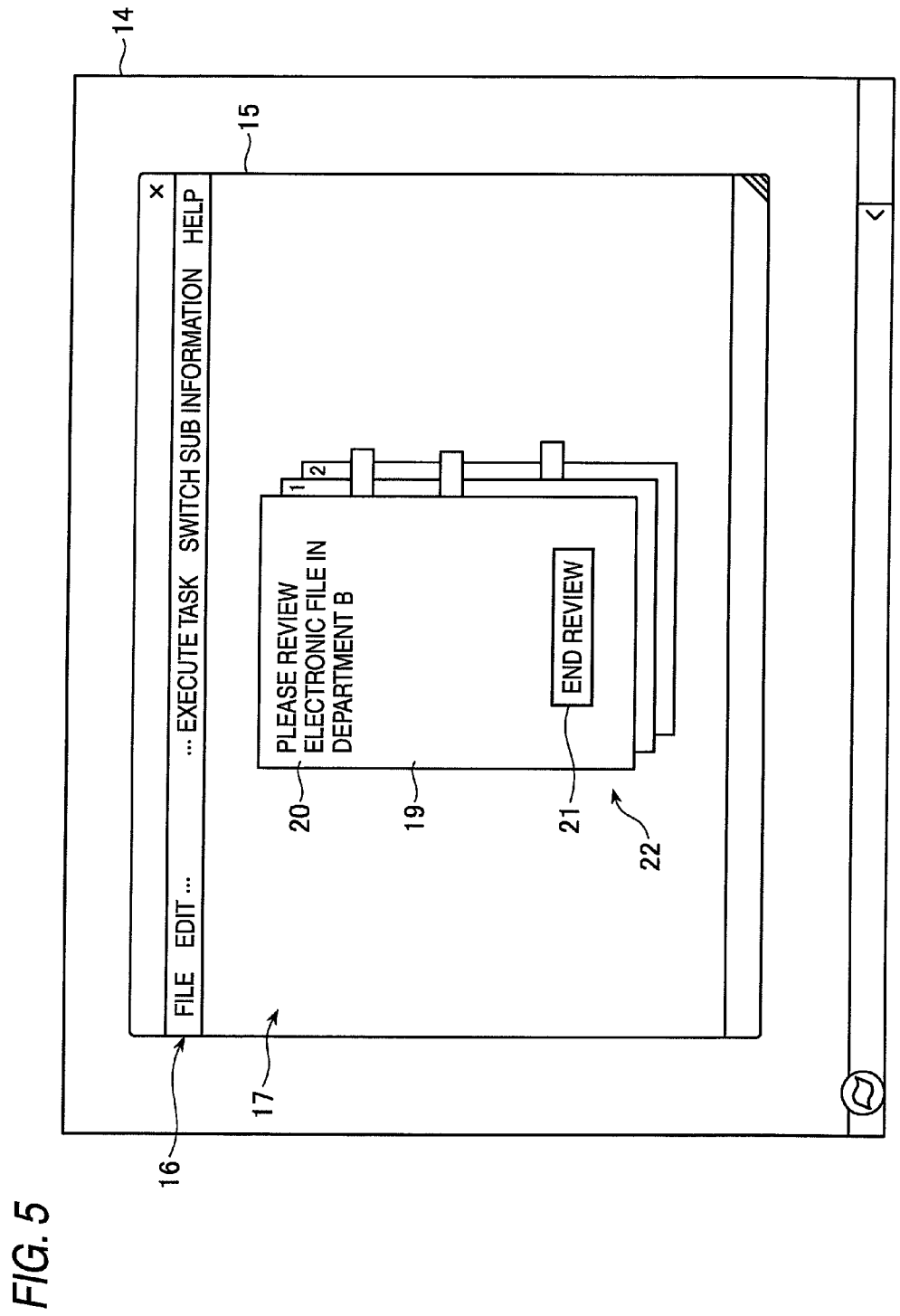
FIG. 5 is a diagram illustrating the display of the electronic file which is reviewed by a user B in the department B and to which tag information is given as additional information.

FIG. 5 is a diagram illustrating the display of the electronic file which is reviewed by the user B and to which tag information is given as the additional information. As shown in FIG. 5, in a display image 22 of the electronic file, a rectangular tag is displayed as the tag information in each page of the main information. The information processing apparatus 1B (see FIG. 2) provided in the department B has the same structure as the information processing apparatus 1A provided in the department A. Therefore, in FIG. 5, the same components as those shown in FIG. 4 are denoted by the same reference numerals. When the user B pushes (clicks) a button 21, the electronic file is sent to the user A, as described with reference to FIG. 3.

FIG. 6 is a diagram schematically illustrating the content of the electronic file shown in FIG. 5. The electronic file shown in FIG. 5 differs from that shown in FIG. 3 in that the additional information given by the user B is included in the sub information. Each additional information item may include, for example, unique identification information for identifying the additional information, the type of additional information, the position and size of the additional information, text information, which is the content of the additional information, and giver information indicating the user who gives the additional information. For simplicity of illustration, FIG. 6 shows only the identification information, the type, the position, and the giver information, and the other information items are not shown. The position indicates the page to which the additional information is given and the coordinates thereof in the horizontal and vertical directions. Any information may be used as the giver information as long as it can specify the giver. As the giver information, for example, the following may be used: the name of the giver or identification information used to log in the information processing apparatus 1; or an electronic certificate certifying that the giver has proper authority.

Similarly, the user C in the department C and the users D and E in the department D review the electronic files, give additional information to the electronic files, and send the electronic files to the user A.

Figure 7:
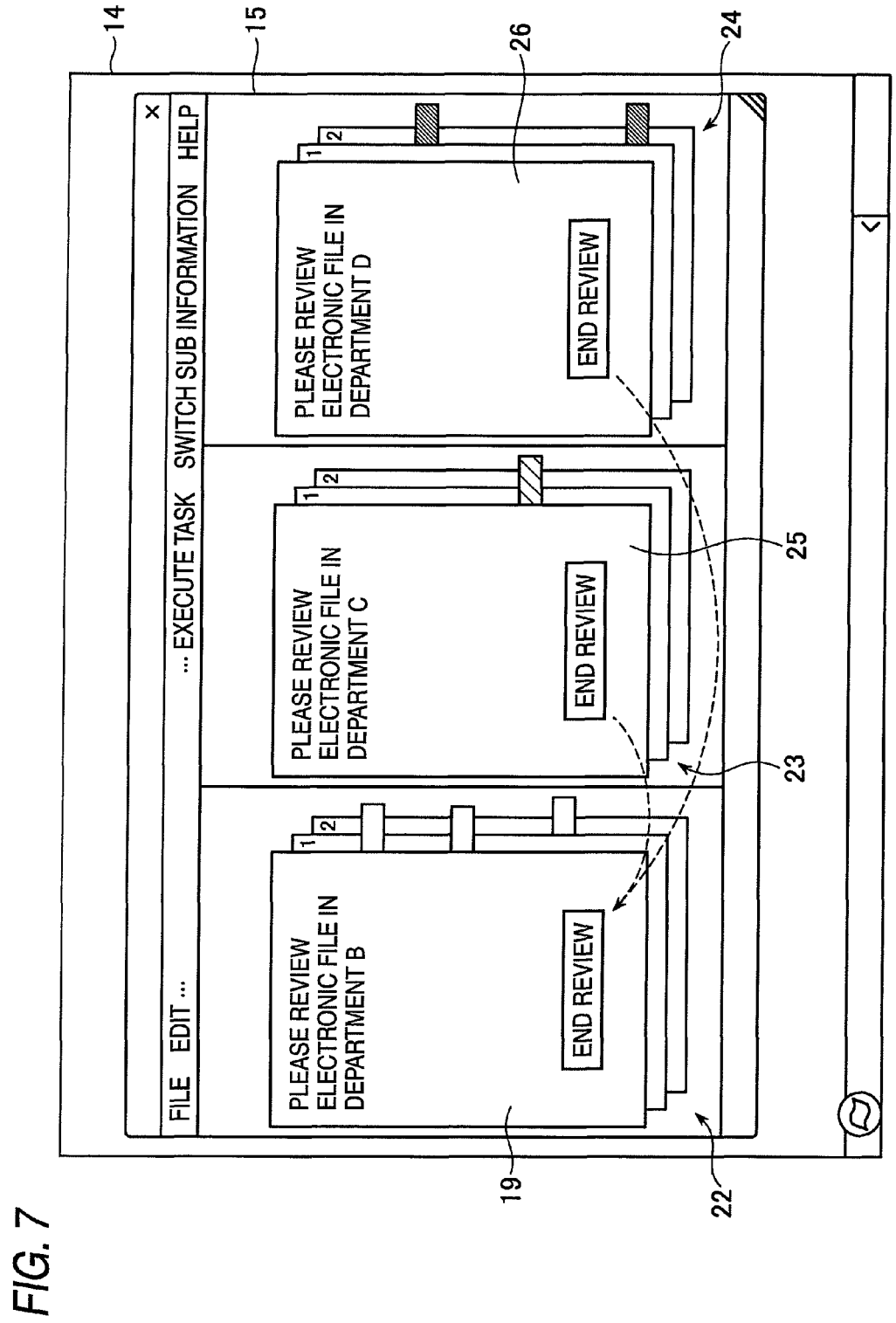
FIG. 7 is a diagram illustrating an example in which a user A reads the electronic files sent back from the department B, a department C, and a department D.

FIG. 7 is a diagram illustrating an example in which the user A reads the electronic files sent back from the department B, the department C, and the department D. The GUI of the information processing apparatus 1 has a function of displaying a plurality of electronic files on the window 15 at the same time. FIG. 7 shows a display image 22 of the electronic file sent back from the department B, a display image 23 of the electronic file sent back from the department C, and a display image 24 of the electronic file sent back from the department D which are displayed by the user A. As shown in FIG. 7, since the departments give different additional information items, different tags are displayed on the display images 22, 23, and 24 of the electronic files. In FIG. 7, for ease of discrimination, the tag, which is the additional information, given to the electronic file by the department B is displayed in white, the tag given to the electronic file by the department C is hatched, and the tag given to the electronic file by the department D is displayed in black. The colors of the tags may be changed, and the colors of the tags, which are the additional information, given by different departments may be different from each other or they may be the same.

The user A performs the following operation in order to add the sub information included in the electronic file sent back from the department C and the sub information included in the electronic file sent back from the department D to the electronic file sent from the department B. That is, as represented by a dashed arrow in FIG. 7, the user performs a so-called drag and drop operation to drop a cover 25 of the electronic file sent back from the department C on the display image 22 of the electronic file. When this operation is performed, the sub information addition allowing unit 9 (see FIG. 1) compares the main information of the electronic file sent back from the department C, which is the drag source of the electronic file, with the main information of the electronic file sent back from the department B, which is the drag destination of the electronic file, and determines whether the main information items are identical to each other. Specifically, the sub information addition allowing unit 9 generates a hash value from the main information of the electronic file, which is the drag destination, and determines whether the generated hash value is equal to the hash value included in the sub information to be added. As a result, in this exemplary embodiment, since there is no difference between the main information items, the hash values are equal to each other, and the addition of the sub information is allowed. Then, the sub information adding unit 8 (see FIG. 1) adds the sub information of the electronic file sent back from the department C to the electronic file sent back from the department B. Similarly, when the user drags a cover 26 of the electronic file sent back from the department D and drops it on the display image 22 of the electronic file as represented by the dashed arrow in FIG. 7, the sub information of the electronic file sent back from the department D is added to the electronic file sent back from the department B. The drag and drop operation of adding the sub information to another electronic file is just an illustrative example. Any other operations may be used to add the sub information.

In this exemplary embodiment, the electronic file sent back from each department includes the main information and the sub information. However, each department may send back only the sub information. In this case, the user adds the sub information sent back from each department to the electronic file of the user.

Figure 8:
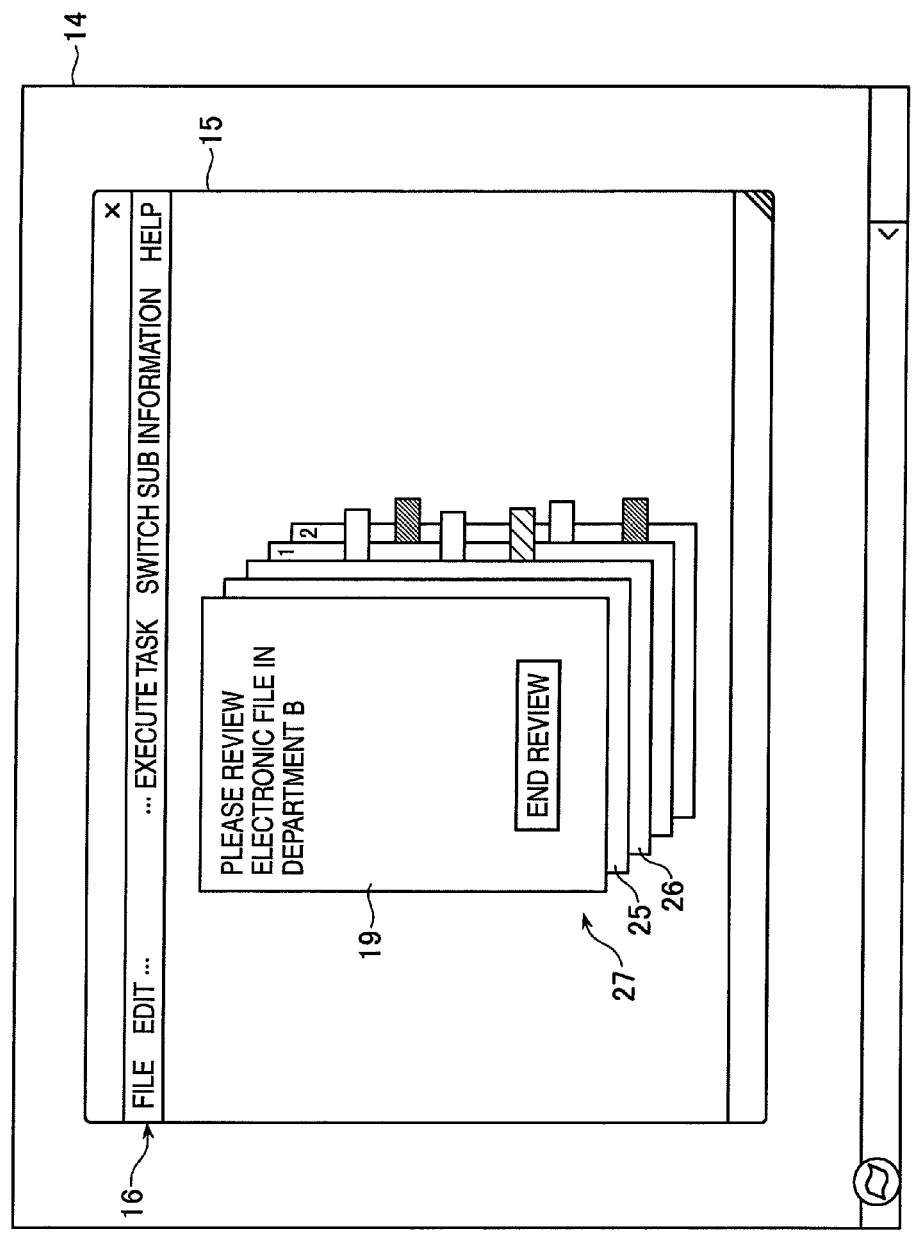
FIG. 8 is a diagram illustrating the display of an electronic file having sub information added thereto.

FIG. 8 is a diagram illustrating the display of the electronic file having the sub information added thereto. A display image 27 of the electronic file includes a cover 19 corresponding to the sub information of the electronic file sent back from the department B, a cover 25 corresponding to the sub information of the electronic file sent back from the department C, and a cover 26 corresponding to the sub information of the electronic file sent back from the department D. In addition, tags corresponding to all additional information items are displayed in the display image 27.

FIG. 9 is diagram schematically illustrating the content of the electronic file shown in FIG. 8. As shown in FIG. 9, the electronic file includes the main information and three sub information items. In FIG. 9, display information included in the sub information, information for specifying the main information, and an operation command are not shown for simplicity of illustration. When displaying the electronic file on the user interface 2, the display unit 5 (see FIG. 1) displays the additional information items included in all the sub information items. As a result, the display image 27 shown in FIG. 8 is obtained.

Figure 10:
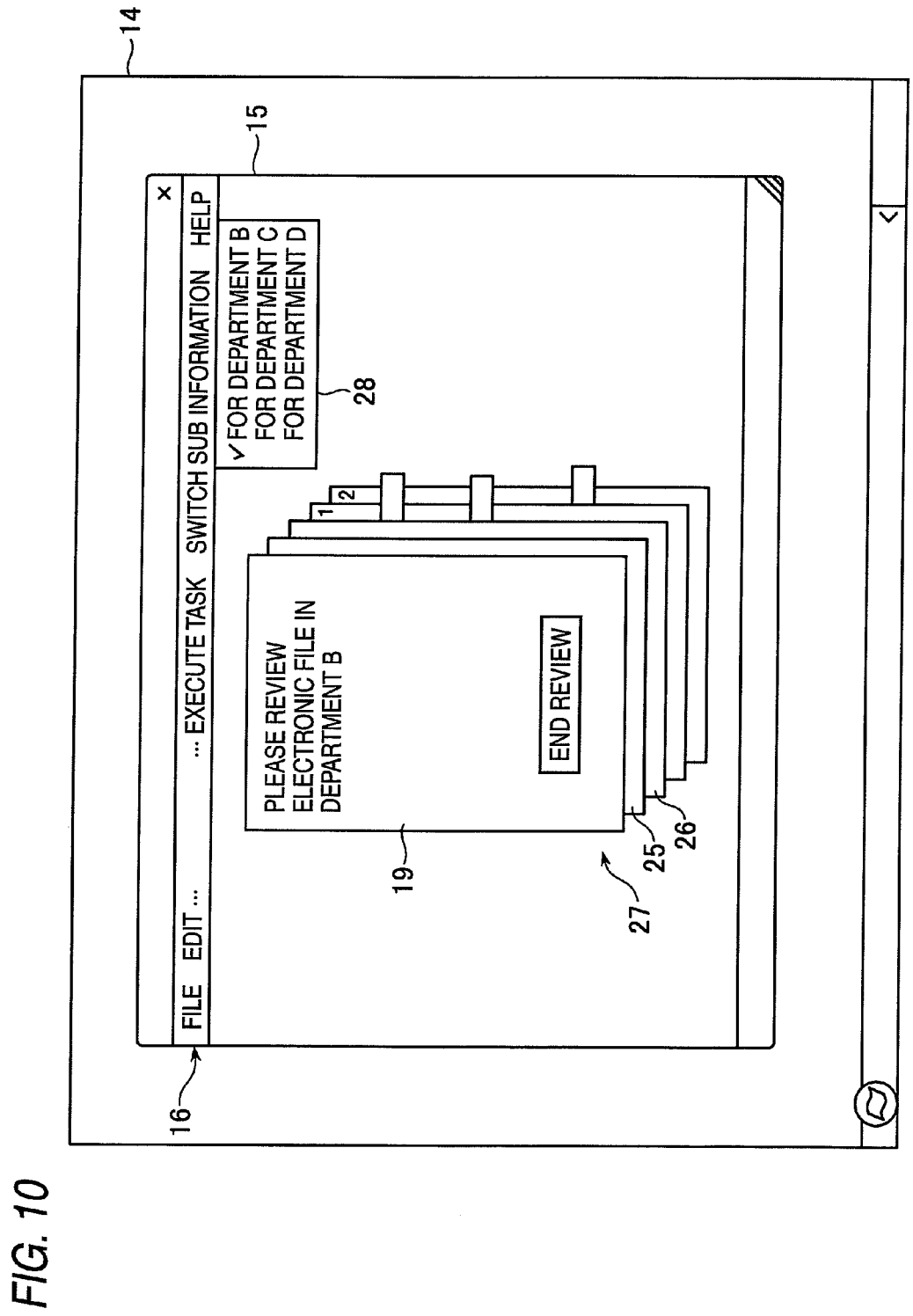
FIG. 10 is a diagram illustrating the switching of sub information.

FIG. 10 is a diagram illustrating the switching of the sub information. In this exemplary embodiment, in the state shown in FIG. 8, when an item 'sub information switching' is selected from the menu region 16 of the window 15, a sub-menu 28 is displayed, as shown in FIG. 10. A list of the names of the sub information items included in the displayed electronic file is displayed in the sub-menu 28, and a check mark indicating whether each sub information item is valid or invalid is displayed on the left side of the name of each sub information item. When the user selects the name of each sub information item, the sub information switching unit 10 (see FIG. 1) switches the validity and the invalidity of each sub information item. When the sub information is valid, the check mark is given to the sub information. When the sub information is invalid, the check mark is deleted. In FIG. 10, only the sub information, which is named 'for department B', included in the electronic file that is sent back from the department B is valid and the other sub information items are invalid. In this case, the display unit 5 (see FIG. 1) displays only the additional information included in the valid sub information. Therefore, in FIG. 10, only the additional information in the sub information that is included in the electronic file sent back from the department B is shown, but the additional information items included in the other sub information items is not shown.

The operation of switching the validity and the invalidity of the sub information items is not limited to the above-mentioned example, but any other operations may be used. In this exemplary embodiment, only the additional information included in the invalid sub information is not displayed. However, the invalid sub information, that is, the cover may not also be displayed. In this case, in the example shown in FIG. 10, the cover 25 and the cover 26 are not also displayed.

In this exemplary embodiment, the selection of the display or the non-display of the additional information is performed on each sub information item, but the invention is not limited thereto. In the example shown in FIG. 9, one of the four users B, C, D, and E who give the additional information may be selected and only the additional information given by the selected user may be displayed. In addition, the additional information to be displayed may be selected on the basis of other conditions, for example, the date and time when the additional information is given or the type of additional information, and a specific operation, such as movement, deletion, or copy, may be performed on the selected additional information. Only the information of the user who gives the additional information included in the sub information may be deleted or changed.

Figure 11:
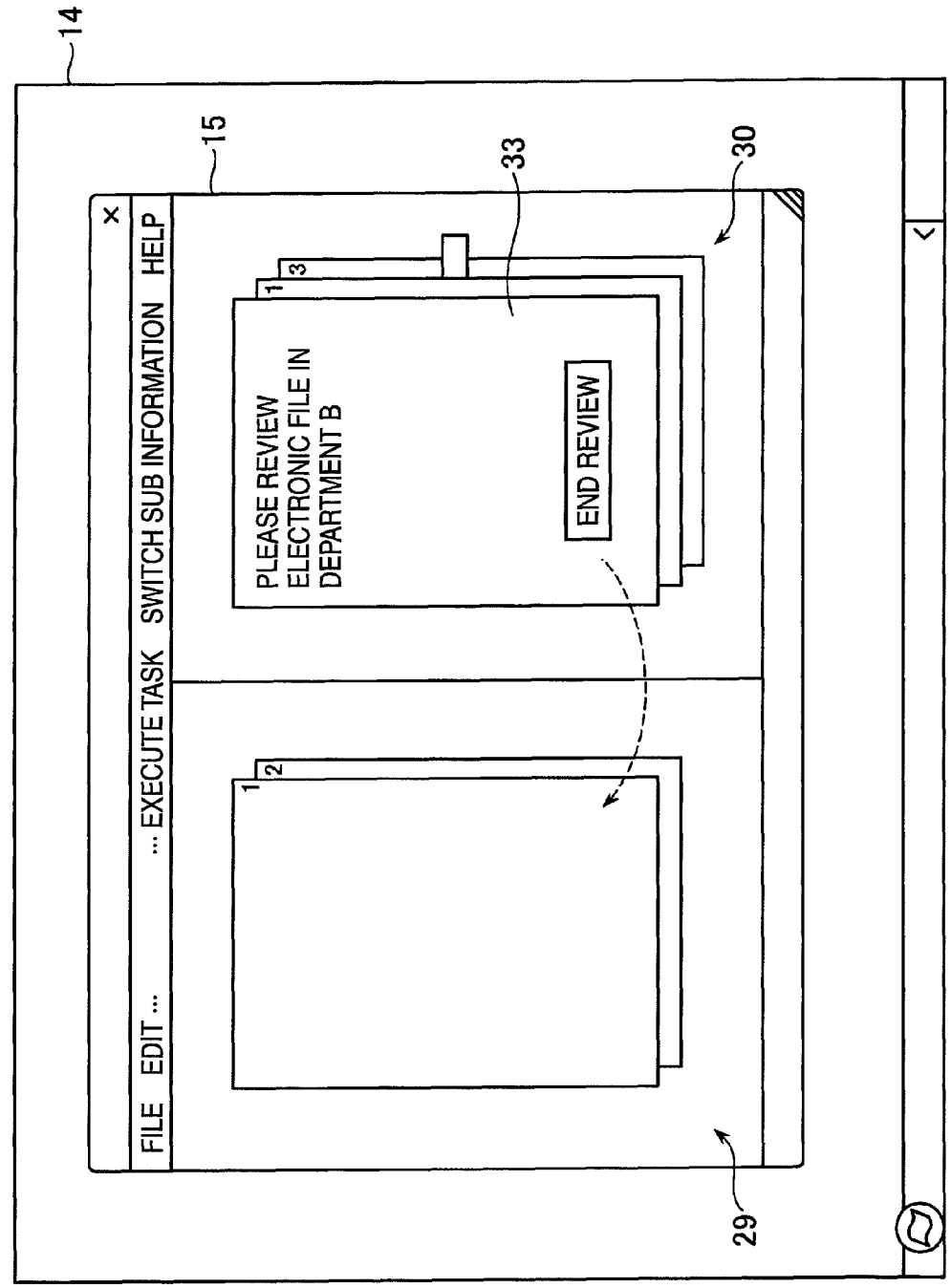
FIG. 11 is a diagram illustrating the correction of the main information during a review.

FIG. 11 is a diagram illustrating the correction of the main information during a review. FIG. 11 shows an example of display when the user A receives the electronic file that has been requested to be reviewed by the department B and then sent back from the department B and views the electronic file before the request and the electronic file sent back from the department B at the same time using the information processing apparatus 1B in FIG. 2. In FIG. 11, a display image 29 of the electronic file including only the main information created by the user A is displayed on the left side of the window 15 and a display image 30 of the electronic file sent back from the department B is displayed on the right side of the window 15. In this case, in the electronic file sent back from the department B, as shown in FIG. 11, a tag is added as the additional information, page 2 of the main information is deleted, and page 3 is newly added.

Figure 12:
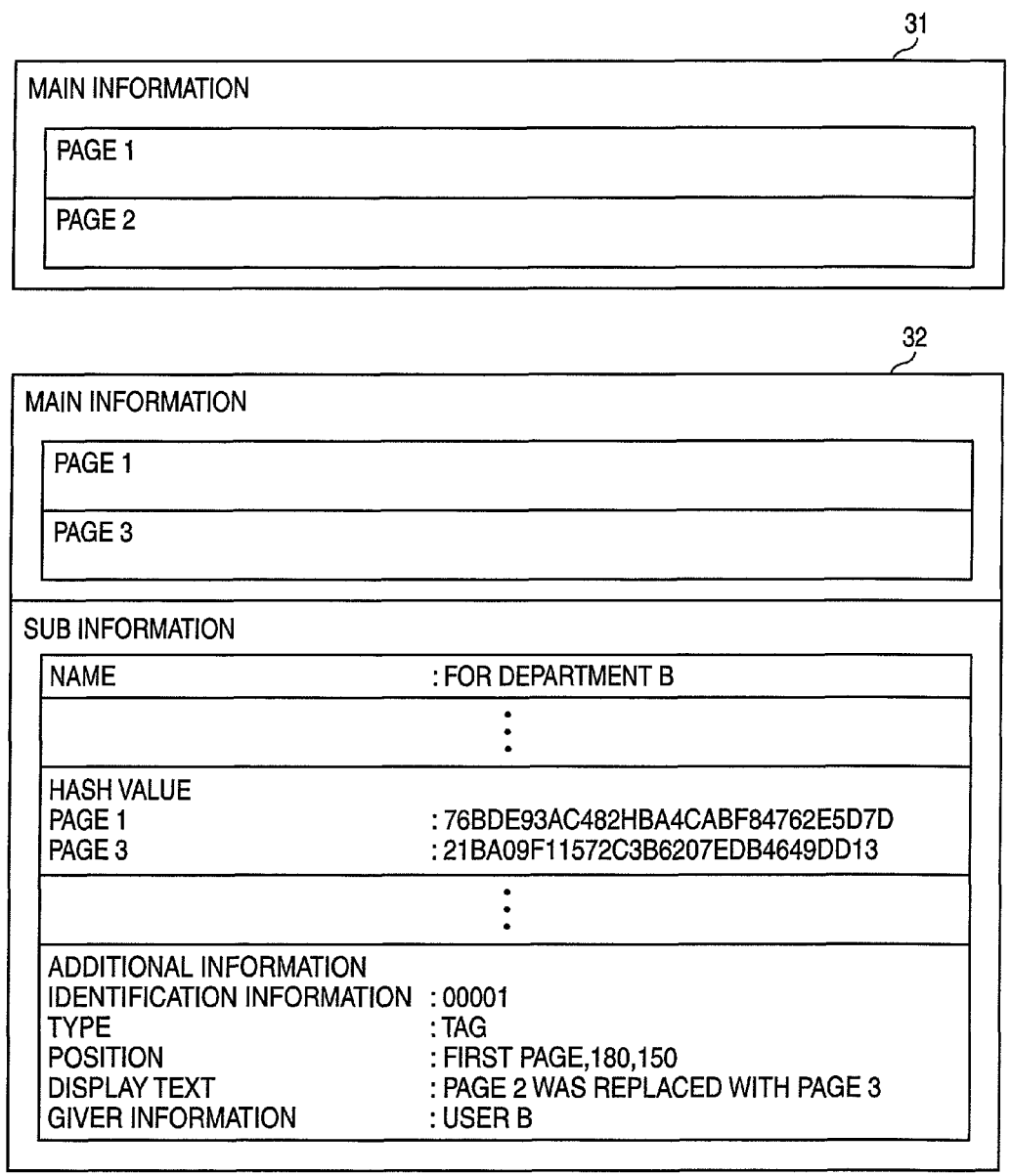
FIG. 12 is a diagram schematically illustrating the content of the electronic file shown in FIG. 11.

FIG. 12 is a diagram schematically illustrating the content of the electronic file shown in FIG. 11. An electronic file 31 shown at an upper part of FIG. 12 includes only the main information that is displayed on the left side of FIG. 11, and an electronic file 32 shown at a lower part of FIG. 12 has been sent back from the department B. In the electronic file 32, the information of page 2 is not included in the main information, but the information of page 3 is added to the main information. The hash values of the pages 1 and 3, which are information for specifying the main information, are included in the sub information. Other information items, such as display information and an operation command, are not shown for simplicity of illustration. The display text included in the additional information is text displayed on a tag when the additional information is displayed as the tag.

In this state, as represented by the dashed arrow in FIG. 11, when the cover 33 in the display image 30 of the electronic file is dragged and dropped on the display image 29 of the electronic file, the sub information addition allowing unit 9 (see FIG. 1) compares the hash value calculated from the main information of the electronic file 31 with the hash value included in the sub information of the electronic file 32. The hash values for the page 1 are identical to each other, but the hash values for the page 2 and the hash values for the page 3 are not identical to each other. Therefore, when the hash values are partially identical to each other, that is, when the main information items are at least partially identical to each other, the sub information addition allowing unit 9 may allow the addition of the sub information. Alternatively, when parts of the main information items are not identical to each other, a message indicating that parts of the main information items are not identical to each other may be presented to the user to inquire whether to continuously perform the operation.

When the sub information addition allowing unit 9 allows the addition of the sub information, the sub information adding unit 8 (see FIG. 1) adds the sub information of the electronic file 32 to the electronic file 31. In this case, the information of the page 3 that is included in the main information of the electronic file 32, but is not included in the main information of the electronic file 31 may be further added to the electronic file 31.

Figure 13:
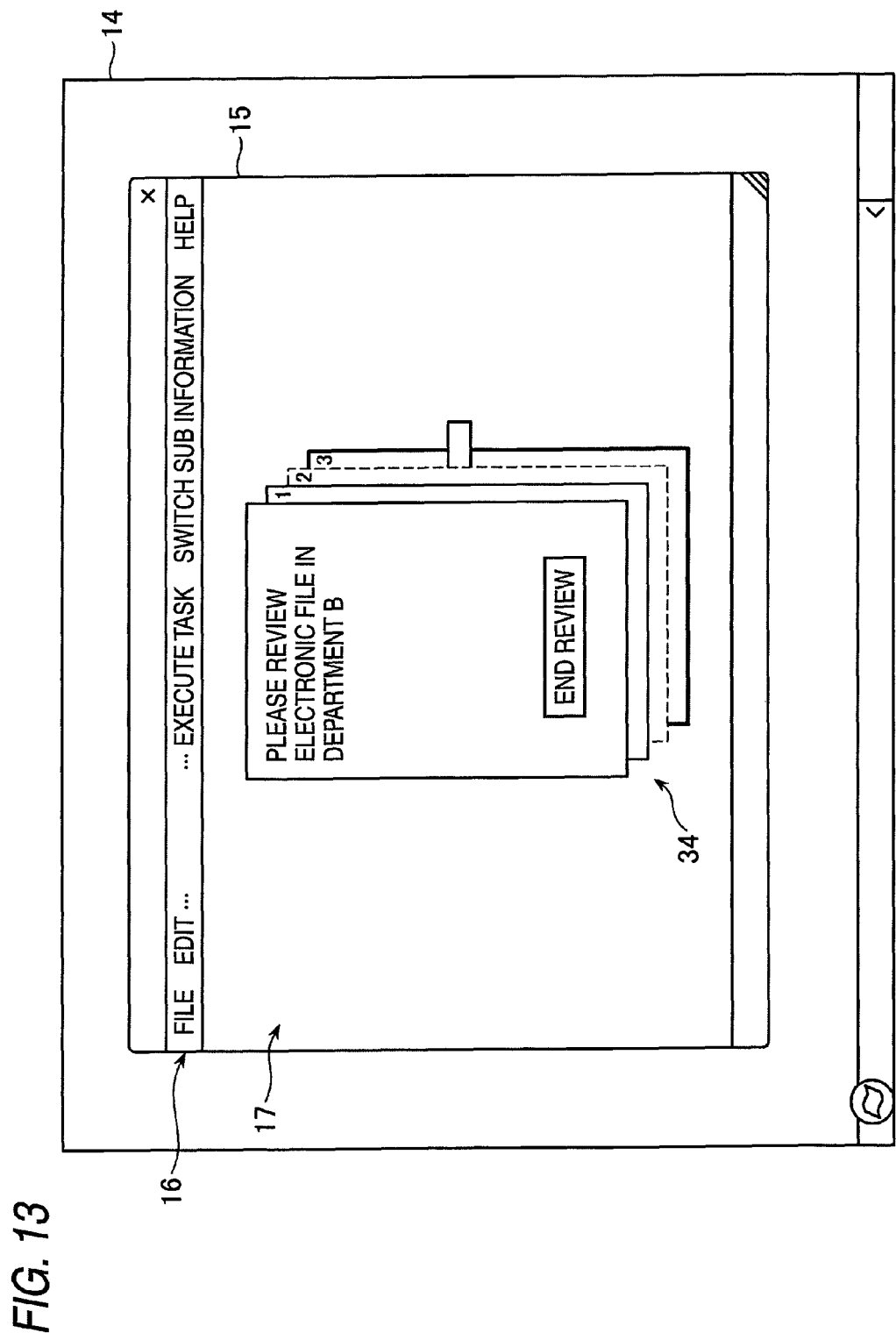
FIG. 13 is a diagram illustrating the display of an electronic file having sub information added thereto.

FIG. 13 is a diagram illustrating the display of the electronic file having the sub information added thereto. In a display image 34 of the electronic file shown in FIG. 13, a second page of the main information is displayed in a color with a low chroma, such as gray, in order to indicate that the second page is deleted during a review (in FIG. 13, the second page is represented by a dashed line). The outline of a third page is highlighted in order to indicate that the third page is added during a review (in FIG. 13, the third page is represented by a bold line). The above-mentioned display is just an illustrative example, and the second and third pages may be displayed by any other methods. That is, when adding the sub information B given to the electronic file B (second electronic file) that is included in the main information B to the electronic file A (first electronic file) including the main information A, the display unit 5 (see FIG. 1) may highlight information that is included in the main information A, but is not included in the main information B, and/or information that is not included in the main information A, but is included in the main information B. Of course, the information may be displayed without being highlighted.

FIG. 14 is a diagram schematically illustrating the content of the electronic file shown in FIG. 13. In the electronic file, the main information includes information of pages 1, 2, and 3. In addition, only the hash values of the pages 1 and 3, which are information for specifying the main information, are included in the sub information, and the page 2 is deleted from the sub information.

Figure 15:
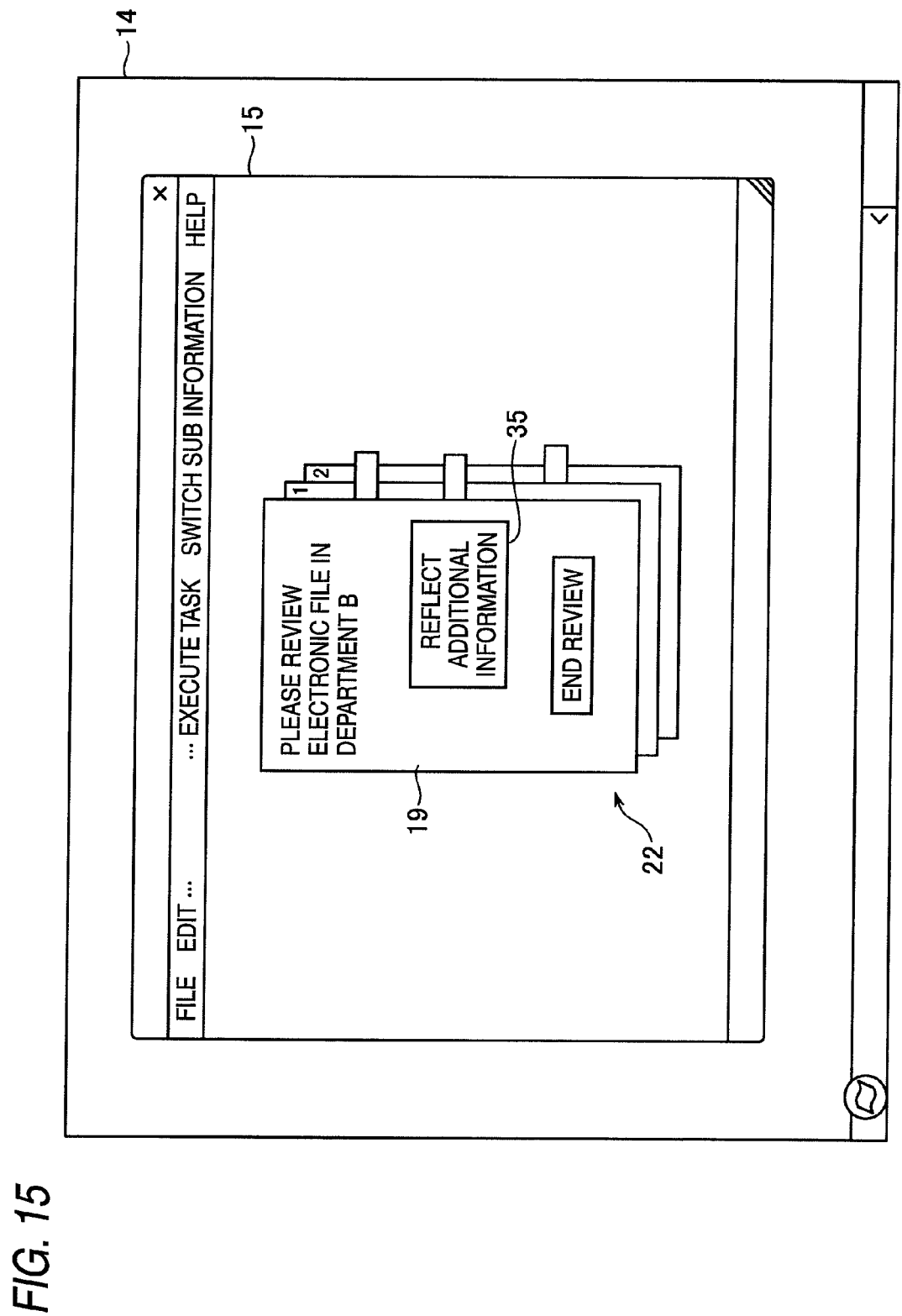
FIG. 15 is a diagram illustrating a change in the association of additional information.

FIG. 15 is a diagram illustrating a change in the association of the additional information. In the example shown in FIG. 15, the electronic file is reviewed by the department B according to a review request from the user A and is then sent back to the user A. It is assumed that the electronic file is the same as that shown in FIGS. 5 and 6. In this case, when a specific operation is performed on the cover 19 in the display image 22 of the electronic file, for example, when a right button of the mouse is pushed on the cover 19, a sub-menu 35 is displayed on the screen 14. When an item 'reflection of additional information' is selected from the sub-menu 35, the association changing unit 12 (see FIG. 1) changes the association of the additional information included in the selected sub information, that is, the sub information corresponding to the cover 19 in which the sub-menu 35 is displayed with the sub information to the association of the additional information with the electronic file. Specifically, in FIG. 6, the position of the additional information included in the sub information is moved to the outside of the sub information. FIG. 16 is a diagram schematically illustrating the content of the electronic file after the association of the additional information is changed. As shown in FIG. 16, in the moved additional information, the relation with specific sub information is removed. Therefore, the additional information is not affected by various operations performed on the sub information, for example, deletion, movement, addition to another electronic file, and switching between validity and invalidity.

The operation of changing the association is just an illustrative example, and any other operations may be performed to change the association. In addition, the association between the additional information and the sub information is not particularly limited by the position of the additional information in the electronic file. For example, data describing the relationship between the additional information and the sub information may be stored. In this case, the association changing unit 12 rewrites the content of the data.

The information processing apparatus 1 according to the above-described embodiment is just an illustrative example. Those skilled in the art may change a display format, a detailed operation method, the storage format of information in the electronic file, and the storage position of information in various ways.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an electronic data receiving unit that receives first electronic data and second electronic data, the first electronic data including first main information and first sub information that indicates a first editorial instruction for editing the first main information and the second electronic data including second main information and second sub information that indicates a second editorial instruction for editing the second main information, wherein the second main information originates from the first main information;
a display unit that displays a first main image of the first main information, a first sub image of the first sub information, a second main image of the second main information and a second sub image of the second sub information distinctively from each other on a monitor, wherein the first main image is generated from the first main information and the first editorial information and the second main image is generated from the second main information and the second editorial information;
an input user interface unit which receives a first action to manipulate the second sub image and a second action to add the second sub information to the first sub information; and
a sub information adding unit that, in response to the input user interface unit receiving the second action following the first action, adds the second sub information to the first electronic data; and
a CPU and a memory, wherein one or more of the electronic data receiving unit, the display unit, the input interface unit, and the sub information adding unit are stored in the memory as instructions and configured for execution by the CPU;
wherein the display unit that, in response to the sub information adding unit adding the second sub information to the first electronic data, displays an updated first main image generated from the first main information, the first editorial information, and the second editorial information.

2. The information processing apparatus according to claim 1, wherein the sub information adding unit determines whether to add the second sub information to the first electronic data by comparing the first main information and the second main information.

3. The information processing apparatus according to claim 1, further comprising:
a sub information switching unit that switches a display state of each of the first sub information and the second sub information in the first electronic data,
wherein the display unit displays the first updated first main image according to the first editorial information and the second editorial information included in the first sub information of the first electronic data based on the display state.

4. The information processing apparatus according to claim 1, wherein,
when the sub information adding unit adds the second sub information to the first electronic data, the sub information adding unit adds information which is included in the second main information, but is not included in the first main information to the first main information.

5. The information processing apparatus according to claim 1, wherein
the display unit displays the second sub image according to the second sub information as a cover sheet of the second main information.

6. The information processing apparatus according to claim 5, wherein both the first and second sub images looks like a cover sheet on the first and second main images, respectively.

7. The information processing apparatus according to claim 1, further comprising:
an association changing unit that changes an association of the first additional information with the first sub information to an association with the first electronic file.

8. The information processing apparatus according to claim 1, further comprising
a sub information incorporation unit that incorporates a data field for the first sub information with the first electronic data; and
a transferring unit that sends the first electronic data to a first editor and receives the second electronic data which is generated by editing the first main information of the first electronic data sent by the transferring unit and edited by the first editor.

9. The information processing apparatus according to claim 1, further comprising:
a second user input interface unit that generates the second editorial information from the second main information of the second electronic data;
a second sub information providing unit that, in response to the second user input interface unit generating the second editorial information, adds the second editorial information as the second sub information to the second electronic data, thereby generating updated second electronic data; and
a transferring unit that transfers the updated second electronic data to the electronic data receiving unit.

10. An information processing system, comprising:
a first terminal according to the information processing apparatus of claim 1; and a second terminal which connects to the first terminal over a network, and comprises:
a second user input interface unit that generates the second editorial information from the second main information of the second electronic data;
a second sub information providing unit that, in response to the second user input interface unit generating the second editorial information, adds the second editorial information as the second sub information of the second electronic data thereby generating updated second electronic data; and
a transferring unit that transfers the updated second electronic data over the network to the electronic data receiving unit of the first terminal.

11. A method of combining editorial changes in an electronic document, comprising:
generating a plurality of secondary electronic files from a primary electronic file, each of the electronic files having main information and sub information;
transferring the plurality of secondary electronic files to a plurality of editor terminals;
receiving at a reviewer terminal a plurality of updated secondary electronic files corresponding to the plurality of secondary electronic files, each of the updated secondary electronic files having additional information added to the sub information of the secondary electronic file, the additional information comprising editorial changes to the main information of the secondary electronic file;
displaying on the reviewer terminal each of the received updated secondary electronic files, each of the updated secondary electronic files displayed as an image with a control suitable for a user to control manipulation of the image of the updated secondary electronic file;
in response to a user using the displayed control of an image of a first of the updated secondary electronic files to cause the image of the first of the updated secondary electronic files to interact with an image of a second of the updated secondary electronic files, adding the additional information of the first of the updated secondary electronic files to the sub information of the second of the updated secondary electronic files.

12. The method according to claim 11, wherein the user uses the displayed control by dragging and dropping the image of the first of the updated secondary electronic files onto the image of the second of the updated secondary electronic files, and in response to the dragging and dropping visual indicators of the additional information for the first and second updated secondary files are displayed as part of the image of the first of the updated secondary electronic files.

13. A non-transitory computer readable medium for combining editorial changes in an electronic document, having instructions stored thereon that when executed by a processor performs a method comprising:
generating a plurality of secondary electronic files from a primary electronic file, each of the electronic files having main information and sub information;
transferring the plurality of secondary electronic files to a plurality of editor terminals;
receiving at a reviewer terminal a plurality of updated secondary electronic files corresponding to the plurality of secondary electronic files, each of the updated secondary electronic files having additional information added to the sub information of the secondary electronic file, the additional information comprising editorial changes to the main infolination of the secondary electronic file;
displaying on the reviewer terminal each of the received updated secondary electronic files, each of the updated secondary electronic files displayed as an image with a control suitable for a user to control manipulation of the image of the updated secondary electronic file;
in response to a user using the displayed control of an image of a first of the updated secondary electronic files to cause the image of the first of the updated secondary electronic files to interact with an image of a second of the updated secondary electronic files, adding the additional information of the first of the updated secondary electronic files to the sub information of the second of the updated secondary electronic files.

14. The non-transitory computer readable medium according to claim 13, wherein the user uses the displayed control by dragging and dropping the image of the first of the updated secondary electronic files onto the image of the second of the updated secondary electronic files, and in response to the dragging and dropping visual indicators of the additional information for the first and second updated secondary files are displayed as part of the image of the first of the updated secondary electronic files.

* * * * *